June 30, 1953 — H. J. SIEKMANN ET AL — 2,643,570
MULTIPLE STATION CENTER DRIVE CRANKSHAFT LATHE
Filed March 13, 1950 — 8 Sheets-Sheet 1

INVENTORS.
HAROLD J. SIEKMANN
AND WALTER R. MEYER
BY Willard S. Grover
ATTORNEY.

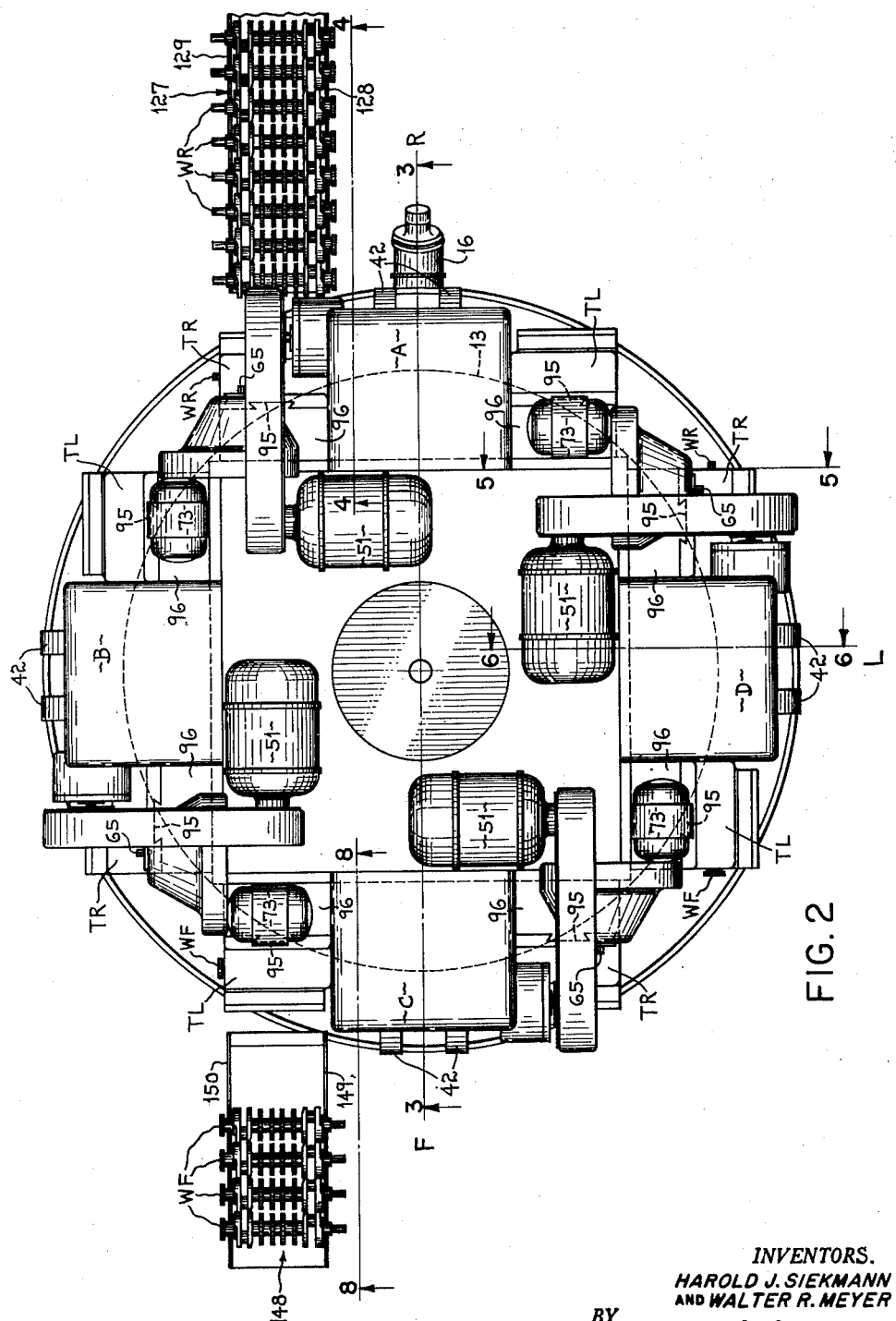

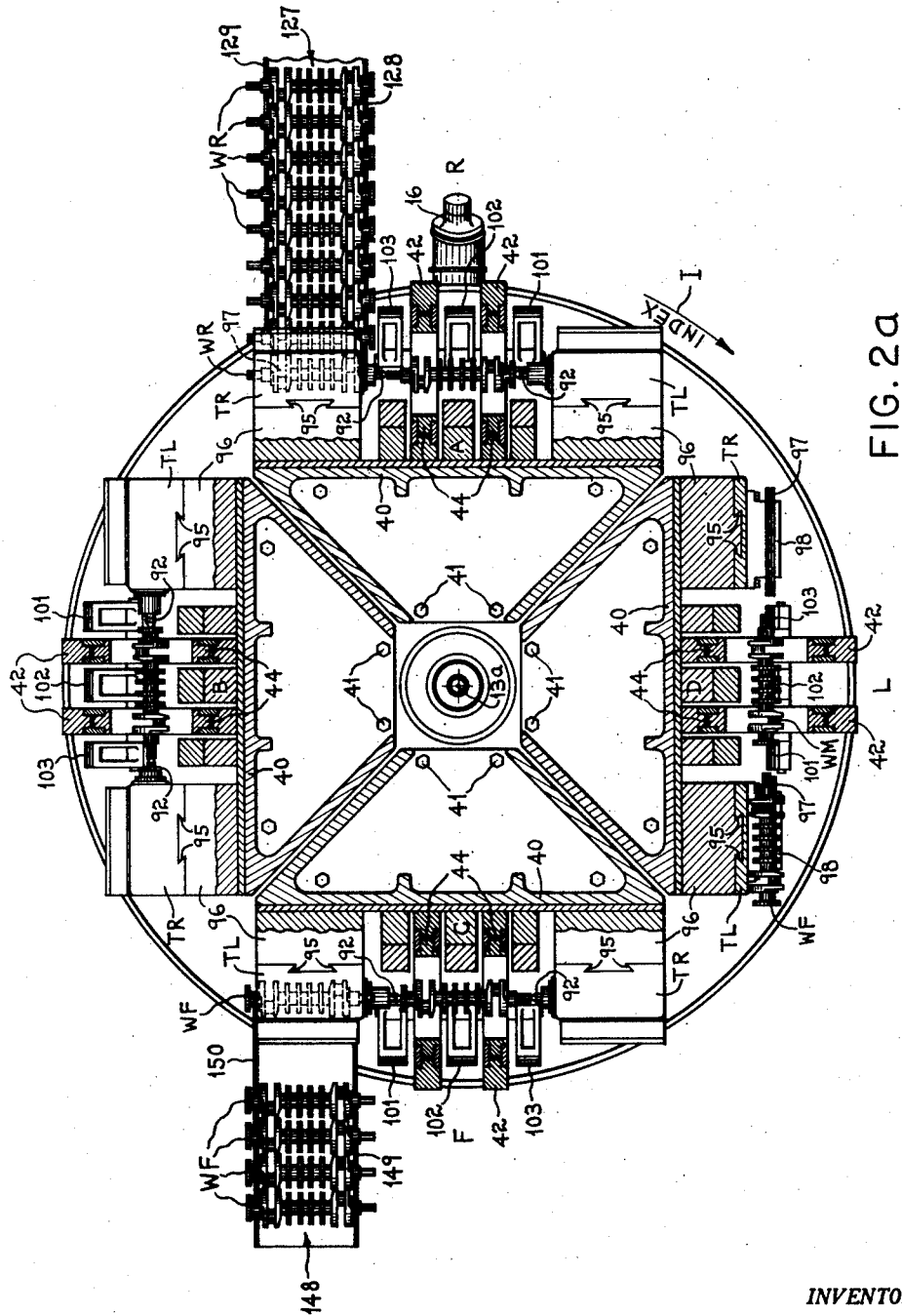

June 30, 1953 — H. J. SIEKMANN ET AL — 2,643,570
MULTIPLE STATION CENTER DRIVE CRANKSHAFT LATHE
Filed March 13, 1950 — 8 Sheets-Sheet 4

INVENTORS.
HAROLD J. SIEKMANN
AND WALTER R. MEYER
BY
Willard S. Growin
ATTORNEY.

June 30, 1953    H. J. SIEKMANN ET AL    2,643,570
MULTIPLE STATION CENTER DRIVE CRANKSHAFT LATHE
Filed March 13, 1950    8 Sheets-Sheet 6

INVENTORS.
HAROLD J. SIEKMANN
AND WALTER R. MEYER
BY
Willard S. Grow
ATTORNEY.

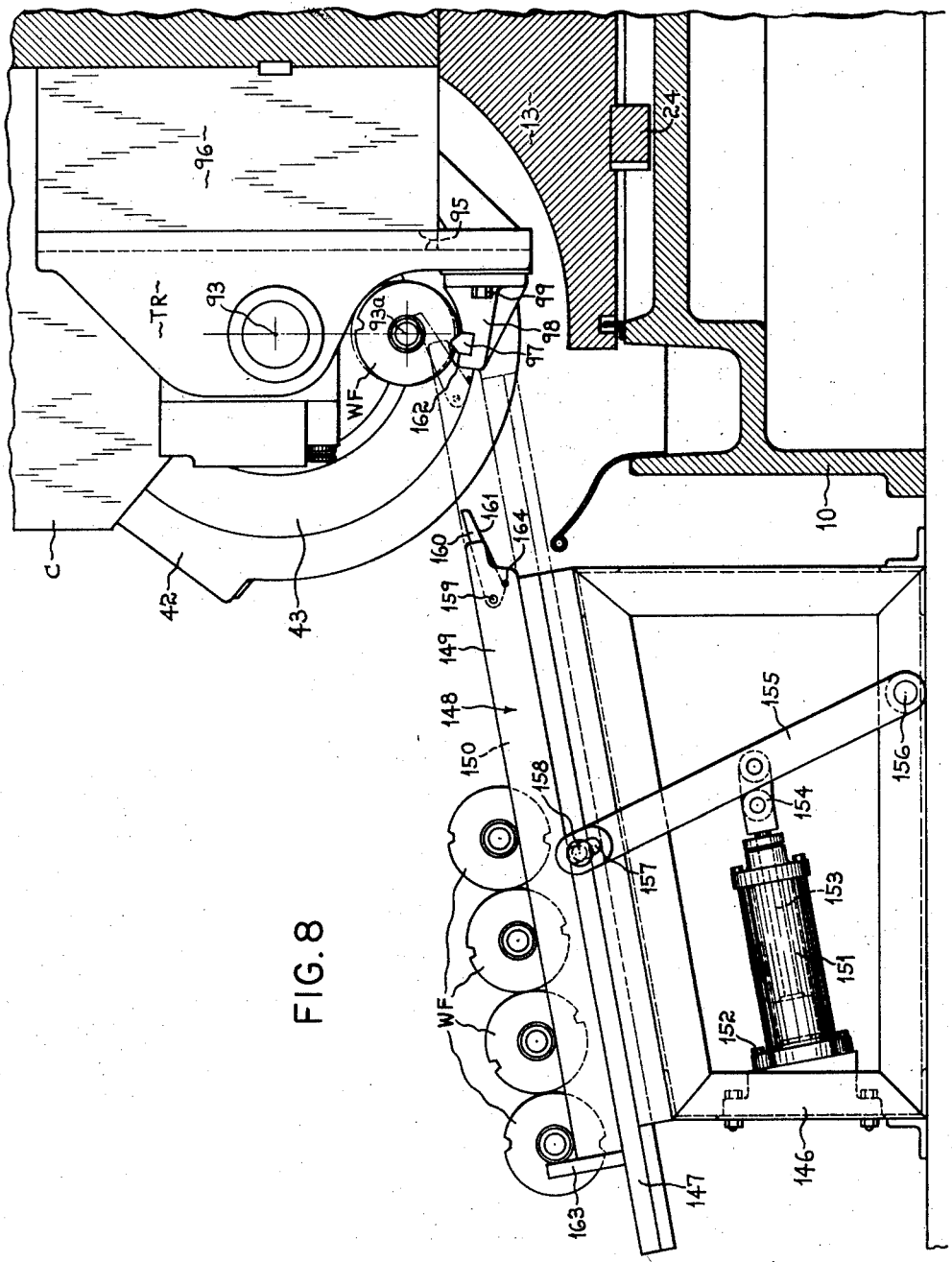

Patented June 30, 1953

2,643,570

UNITED STATES PATENT OFFICE 2,643,570

MULTIPLE STATION CENTER DRIVE CRANKSHAFT LATHE

Harold J. Siekmann and Walter R. Meyer, Cincinnati, Ohio, assignors to The R. K. Le Blond Machine Tool Co., Cincinnati, Ohio, a corporation of Delaware Application March 13, 1950, Serial No. 149,394

3 Claims. (Cl. 82—2.7)

This invention pertains to machine tools for the machining of the line bearings of multi-throw internal combustion engine crankshafts. More particularly, this invention is directed to the simultaneous machining of all of the line bearings of such crankshafts in a continuous manner in a multiple station type center drive crankshaft lathe.

One of the objects of this invention is to provide an improved method and apparatus for loading and unloading crankshafts in a machine tool for turning all of the line bearing portions simultaneously so as to reduce the loading and unloading time to a minimum.

Another object of this invention is to provide an arrangement for automatically loading and unloading crankshafts in a multiple station center drive crankshaft lathe so that the operator's effort is reduced to simply locating and chucking the crankshafts in the center drive lathe units in such a manner that the work pieces need not at any time be lifted by the operator.

Still another object of this invention is to provide a multiple station center drive lathe having a single operator's station where the operator positions and clamps the work crankshafts in the center drive chucks or removes the crankshafts therefrom, the machine being arranged to automatically present unfinished crankshafts for chucking and unchucking in working position in the lathe units at the operator's station, and to automatically remove finished crankshafts from the lathe units.

A further object is to provide a series of center drive crankshaft lathes on an indexing table so as to successively present each of said lathes to a work receiving station, a chucking station, and a work unloading station in an automatically operating sequence.

Another object is to provide a multiple station center drive lathe with a work loading station and a work unloading station and an operator's chucking station located intermediate said loading and unloading stations to facilitate a rapid and continuous operation of the machine in turning the line bearings of a crankshaft.

Another object is to provide a multiple station center drive lathe with radially shiftable tailstocks and work receiving rails on said tailstocks which automatically receive unmachined crankshafts and discharge finished machined crankshafts as the lathe indexes to a series of work stations and an operator's chucking station to provide a continuous machining operation on the line bearings of the crankshafts.

A further object is to provide a novel loading arrangement for automatically presenting workpieces to the receiving rails of the shifting tailstocks of the center drive lathe units and for automatically removing the finished workpieces therefrom during a continuous machining operation of the lathe units on workpieces in the machine.

And another object is to provide an improved swinging supplemental supporting and guide rail to facilitate axial positioning of the crankshafts in the center drive ring gears at the operator's chucking station.

Further features and advantages of this invention will appear from the following detailed description of the drawings in which:

Figure 2 is a plan view of the machine of Figure 1.

Figure 2a is a fragmentary section on the line 2a—2a of Figures 1 and 3.

Figure 8 is an enlarged fragmentary sectional view on the line 8—8 of Figure 2, showing the unloading track mechanism.

Figure 1:
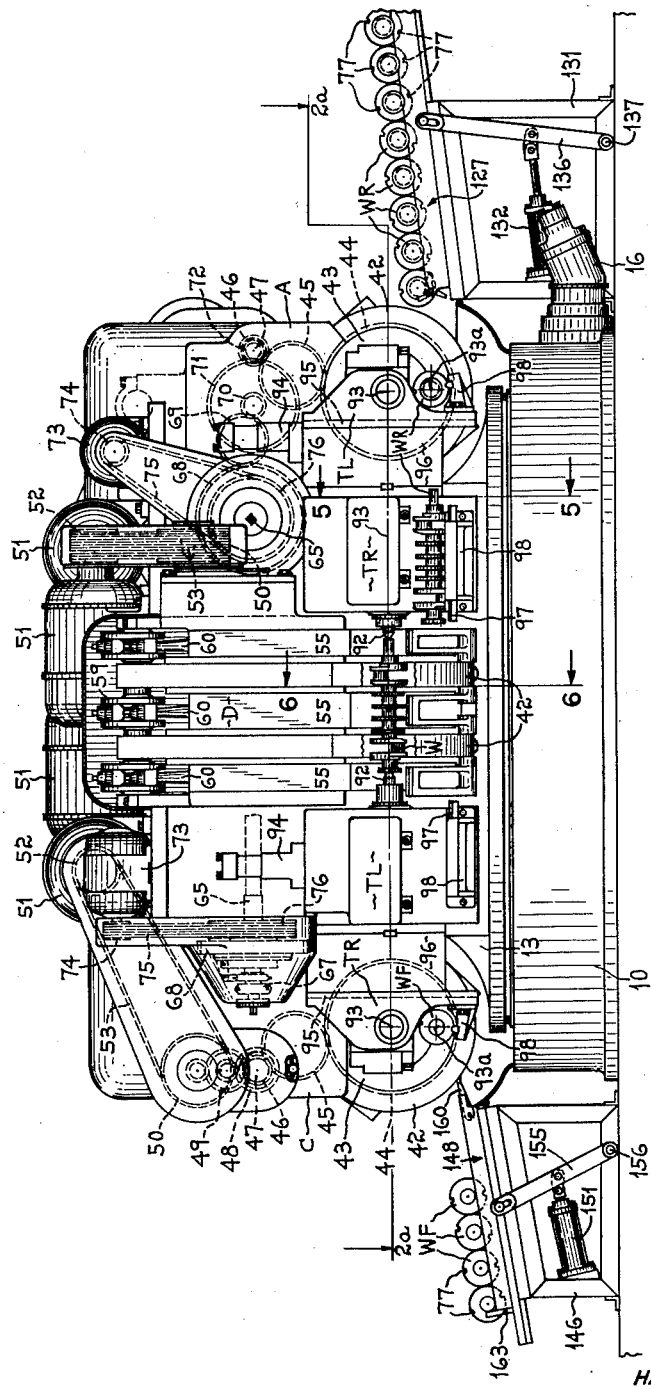
Figure 1 is a front elevation of a machine incorporating the features of this invention.
Figure 3:
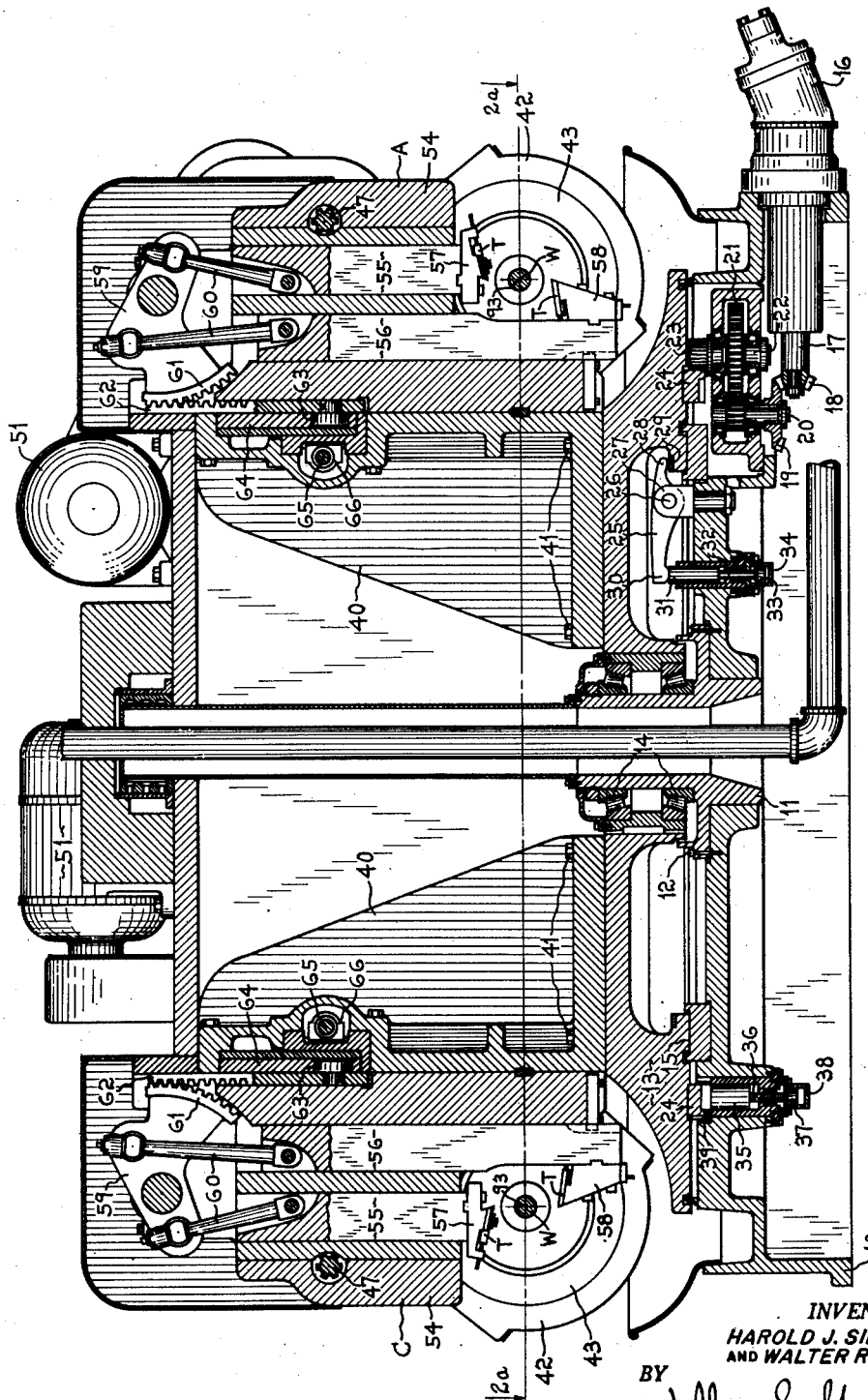
Figure 3 is a diagrammatic transverse sectional view on the line 3—3 of Figure 2, particularly showing the indexing table mechanism and the tool feeding mechanism for the cutting tool of the center drive lathe units.

A machine incorporating the features of this invention comprises a circular base 10, Figure 3, having a central trunnion member 11 fixed to the base by screws 12. A rotating and indexing table 13 is journaled on suitable bearings 14 supported by the trunnion member 11. The table is also journaled on an annular bearing 15 on the base 10. The table is rotated to desired indexed positions by a hydraulic motor 16 having a drive shaft 17 upon which is fixed the bevel pinion 18 driving the bevel gear 19 on the shaft 20. The shaft 20 is connected through suitable gearing 21 to drive the pinion shaft 22 having the pinion 23 which meshes with the large annular gear 24 fixed to the table 13 so that energizing the motor 16 causes rotation of the table 13. A brake and clamping mechanism is provided comprising a lever arm 25 pivotally mounted on the pivot pin 26 carried on the forked member 27 fixed to the base 10. This lever 25 has one end 28 arranged to engage the hardened ring 29 on the table 13 while its other end 30 is actuated by the hydraulic actuating plunger 31 in turn connected through the piston rod 32 to the actuating piston 33 in the cylinder 34. An indexing plunger 35 reciprocatably mounted in the base 10 of the machine is connected through the piston rod 36 to the actuating piston 37 in the cylinder 38 so as to precisely locate the table in desired indexed positions, the indexing plunger dropping into suitable indexing notches 39 formed in the ring gear 24. The hydraulic motor 16 and the cylinders 34 and 38 may be controlled in a desired sequence by any well known hydraulic and electrical control apparatus. Since the details of such apparatus forms no specific part of this invention, it will not be described herein.

On the table 13 is mounted a series of four double center drive crankshaft lathe units, A, B, C and D, Figure 2. Each of these units are identical so that a description of one will suffice for all the others. Each of these units are constructed in a manner as fully set forth in Patent 2,069,107 issued January 26, 1937, comprising a supporting housing member 40, Figure 3, secured to the table 13 by screws 41. Fixed to the supporting housing 40 are a pair of center drive housings 42 in which is journaled the center drive ring gears 43 which are driven through the center drive gear 44, the idler gear 45, and gear 46, from the drive shaft 47. The shaft 47 is connected to be driven through change gearing 48 and 49 from the main driving pulley 50 which in turn is driven from the main driving motor 51 having the motor pulley 52 and the belts 53.

Each side of and between the center drive housings 42 are the tool carrier units 54 each of which contains the upper and lower tool bars 55 and 56, Figure 3, on the outer ends of which are mounted the tool blocks 57 and 58 containing the cutting tools T for machining all of the line bearing portions on the work crankshaft W. The tool bars are reciprocated by the feed crankshaft 59 through the connecting rods 60, the feed crankshaft being actuated through the segmental gear 61 which is in mesh with the rack bar 62 having the cam roller 63 which engages the feed cam plate 64 slidably mounted in the supporting housing 40. The cam plate 64 is actuated by the feed screw 65 which is journaled against axial movement on the housing 40 and operates in the nut 66 fixed to the cam plate 64. The screw 65 is driven through a suitable disengageable feed clutch 67 from the gearing 68, 69, 70 and 71, and the gear 72 fixed on the drive shaft 47. Rapid traverse driving power for actuating the feed screw 65 is derived from the rapid traverse motor 73 which is connected through the motor pulley 74, the belts 75, and the pulley 76 fixed to the feed screw 65. All of this apparatus is fully disclosed in the aforementioned Patent 2,069,107, so that further detailed description of this mechanism is not further required in this specification.

Figure 6:
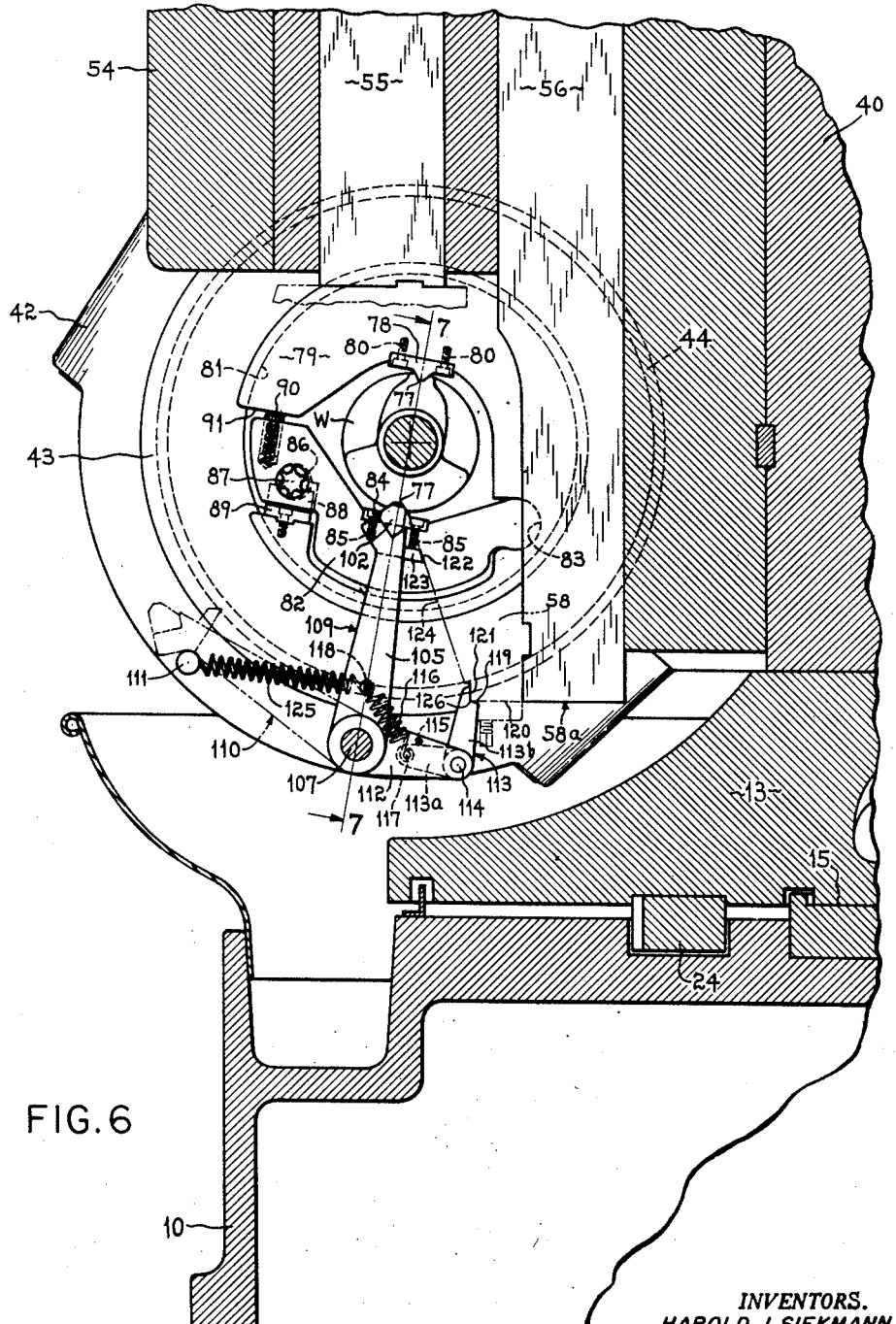
Figure 6 is an enlarged fragmentary sectional view on the line 6—6 of Figure 1 and 2, particularly showing the center drive chucking mechanism and supplemental guide rail mechanism.

The crankshafts W to be machined are preferably provided with axially extending V-shaped locating notches or areas 77 on the periphery of the rough webs of the crankshaft, such for example as shown in Patent 2,197,076, issued April 16, 1940. As best seen in Figure 6, the crankshaft is located in the center drive ring gears 43 on the fixed locating block 78 secured to the segmental member 79 of the chuck by screws 80, the segmental member in turn being fixed in the bore 81 of the ring gear 43. A clamping member 82 is pivotally mounted at 83 in the member 79 and has a locating block 84 fixed thereto by screws 85, the block 84 engaging the diametrically opposite notches 77 on the crankshaft from the notches 77 engaged by the block 78. The other end of the clamping member 82 is provided with a clamping eccentric 86 having a wrench socket 87 by which the operator may clamp and unclamp the chuck. The eccentric 86 operates against the clamping block 88 which in turn engages the abutment block 89 fixed to the member 79. A spring urged plunger 90 engaging the face 91 of the member 79 serves to move the clamping member 82 away from the work crankshaft W when the eccentric 86 is loosened.

The crankshaft W is supported on its ends by centers 92 which are carried in left hand tailstock TL and right hand tailstock TR which are arranged to be shifted radially of the axis of rotation 93 of the center drive ring gears on suitable guideways 95 by suitable hydraulic cylinders 94 on the tailstock base member 96 in a manner as fully set forth in Patent 2,211,722, issued August 13, 1940. Each of the tailstocks is provided with a work receiving rail 97 fixed in a bracket 98 secured to the front face of the tailstock by the bolts 99. The tailstocks are arranged to shift radially from a position with the centers 92 on the ring gear axis 93 to an operative position for the receiving rails 97 where a workpiece W, supported by the V-notches 77 on the rail 97, has its main axis of rotation 93a positioned on the ring gear axis 93. When the workpiece or crankshaft W is in the latter position, it may be readily slid axially on the rails 97 into or out of the center drive chucking devices.

Figure 7:
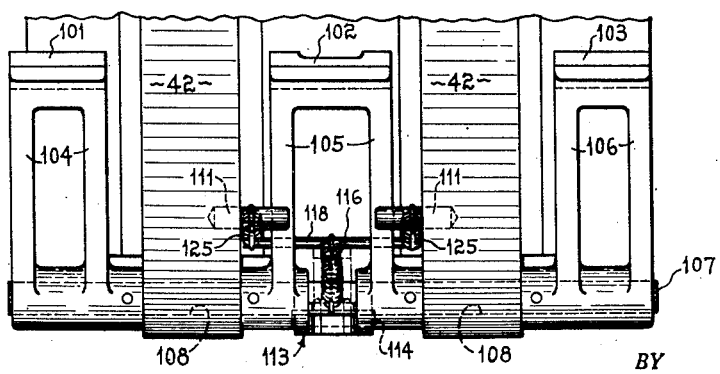
Figure 7 is an enlarged fragmentary sectional view on the line 7—7 of Figure 6, showing a portion of the supplemental guide rail mechanism.

In order to facilitate the easy sliding of the workpiece crankshafts W into and out of the center drive chucks as above described, a series of supplemental swinging guide rails 101, 102 and 103 are provided, Figures 6 and 7. The rails 101 and 103 are located between the tailstocks and the center drive housings 42 while the rail 102 is located between the two center drive housings 42. These rails 101, 102 and 103 are each respectively carried on the swinging arms 104, 105 and 106 which are fixed to the rock shaft 107 journaled in suitable bearings 108 in the center drive housings 42. These rails may swing from a position 109 for guiding the crankshafts into and out of the chucks to a retracted position 110 where the swinging arms have swung down against the stop pins 111 fixed in the center drive housings 42. During the cutting operation the swinging rails normally remain in this position 110 out of the way. After the cutting operation has been completed and the tool bars and tool blocks have returned to retracted position 58a, the operator manually swings the rails 101, 102 and 103 upwardly to the position 109. The rails are held in this position by a latching means comprising lever arms 112, Figure 6, formed integral with the swinging arm 105, on the outer ends of which is pivotally mounted the bellcrank pawl 113 on the pin 114. The arm 113a of the pawl 113 is normally resiliently held against the stop pin 115 fixed in the arm 105 by a tension spring 116 connected between the pin 117 fixed in the outer end of the arm 113a and the cross pin 118 in the swinging lever 105. The outer end of the arm 113b of the bellcrank 113 has a latch surface 119 which engages behind the surface 120 of the tool block 58 located between the center drive chuck housings 42 and has a stop surface 121 to hold the latch in proper position with the tool block in retracted position 58a. A further stop surface 122 on the projection 123 of the swinging arm 105 engages the surface 124 of the tool block 58 and a tension spring 125 interconnected between the pins 111 and 118 serves to hold the rails 101, 102 and 103 in swung-up position 109. It will be noted that the rails 101, 102 and 103 are clear of the crankshaft when the crankshaft is properly axially located in the center drive chucks so that the chucks and ring gears may be rotated at this time with the rails in swung-up position 109. As soon as the cutting tools are started to traverse from retracted position 58a into the work crankshaft W, the surface 119 of the latch 113 slips past the edge 126 of the tool block 58 to allow the rails 101, 102 and 103 to be swung back down to withdrawn position 110.

Figure 4:
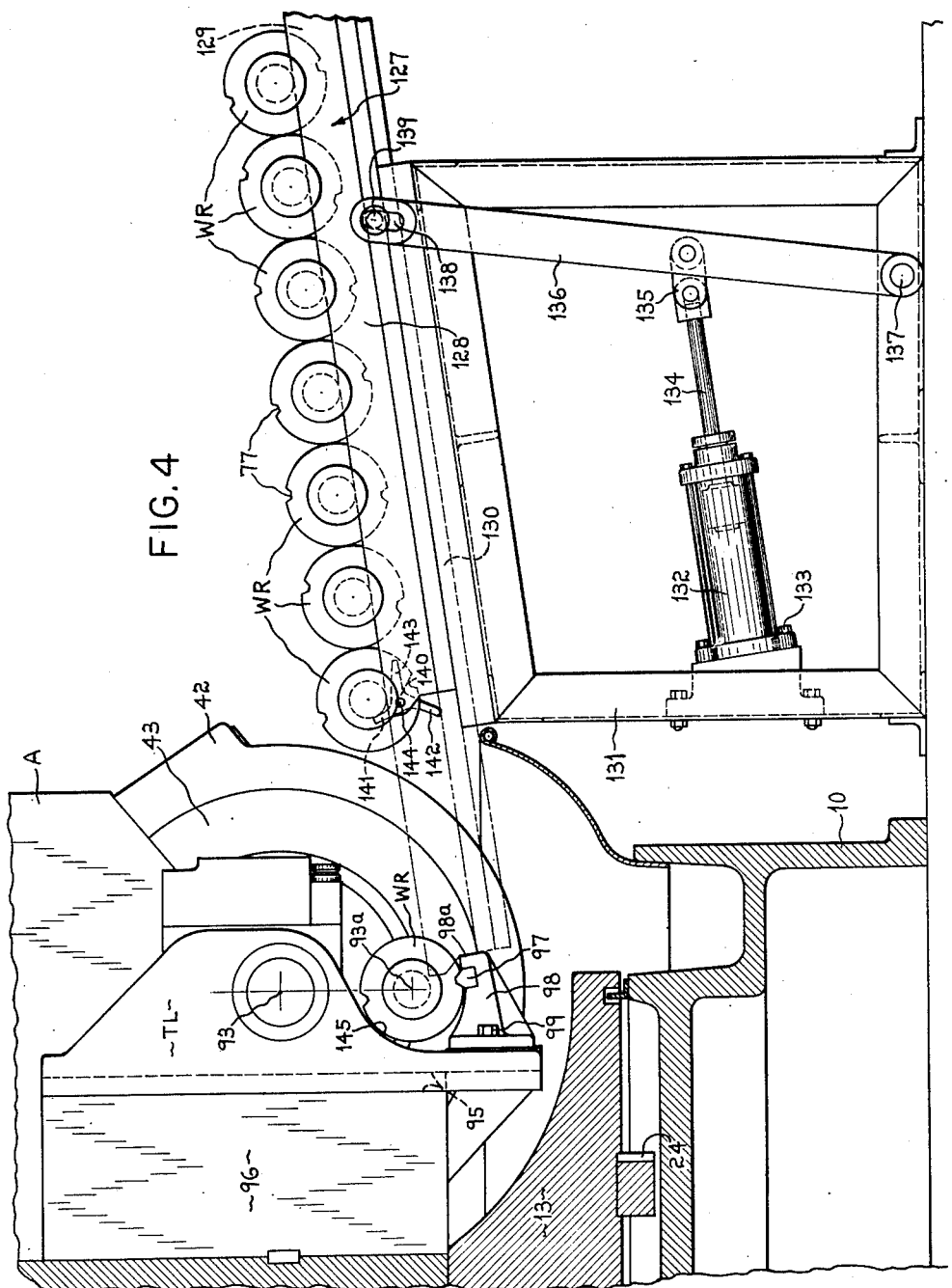
Figure 4 is an enlarged fragmentary sectional view on the line 4—4 of Figure 2, particularly showing the loading track mechanism.

The rough unmachined crankshaft WF, Figure 4, are placed on the downwardly and inwardly inclined loading track 127 comprising a pair of rails 128 and 129 which is reciprocatable on suitable guideways 130 on the loading frame 131 fixed to the floor upon which the machine base 10 rests. The rails are reciprocated by means of the fluid pressure operated cylinder 132 fixed to the frame 131 by bolts 133. The cylinder 132 has a piston rod 134 connected through a link 135 to an actuating lever 136 pivotally mounted at 137 on the frame 131. The upper portion of the lever has an elongated slot 138 engaging around the pin 139 fixed to the rails 128 and 129 so that by appropriate application of fluid pressure to the cylinder 132, the reciprocation of the rails 128 and 129 is effected. The rails are arranged to slope downwardly toward the right hand tailstock TR of a center drive lathe unit when indexed to the unfinished work loading station R to receive rough workpieces WR.

A trip stop 140 having three projecting arms 141, 142 and 143 is pivotally mounted at 144 on the inner end of the rails 128 and 129. The rails 128 and 129 are normally held in retracted position by the cylinder 132 during the indexing movement of the table 13. When a center drive lathe unit is brought into position at the loading station R to receive a rough workpiece, the cylinder 132 is operated to move the loading track 127 in toward the right hand tailstock TR, to the broken line position shown in Figure 4. This causes the arm 142 of the trip stop 140 to engage the face 98a of the loading rail bracket 98 so as to rotate the trip stop to lower the arm 141 and allow a crankshaft WR to roll on to the loading rail 97. The cylinder then is actuated to withdraw the track 127, releasing the arm 142 so that the arm 141 again swings up due to the downward action of the arm 143, to keep the remaining rough crankshafts WR in proper position on the loading track for the next loading cycle. The orientation of the chucking V-notches 77 about the axis 93a at this time is of no importance as the crankshafts are rotated by the operator to properly position the V-notches when the unit indexes to the chucking and unchucking station L. The crankshaft is thus automatically loaded on the right hand tailstock TR on its loading rail 97, the crankshaft resting against the surface 145 of the tailstock so that it will be carried while so supported around to the chucking and unchucking station L with the indexing of the table 13.

Apparatus is provided for automatically removing the finished crankshafts WF from the machine at the completion of the machining operation. This arrangement is best shown in Figure 8, and comprises a frame 146 mounted on the floor which carries the machine base 10. On top of the frame is provided the sloping guideways 147 upon which is reciprocatably mounted the unloading track 148 comprising the rails 149 and 150. The unloading track 148 is reciprocated by the fluid pressure operated cylinder 151 fixed to the frame 146 by the bolts 152. This cylinder has a piston rod 153 connected through a link 154 with the lever arm 155 pivotally mounted at 156 on the frame 146. The upper end of the lever arm 155 is provided with an elongated slot 157 in which operates the pin 158 fixed to the unloading track so that when fluid pressure is appropriately applied to the cylinder, the unloading track may be reciprocated on the ways 147. On the upper raised inner end of the rails 149 and 150 are pivotally mounted at 160 the pickup fingers 159. As the rails are moved to the pickup position indicated in broken lines, the under surface 161 of the pickup fingers engages the edge 162 of the receiving rail bracket 98 causing the fingers to raise up, lifting the crankshaft by its end line bearings and causing it to roll clear of the receiving rail 97 so that it rolls down the rails 149 and 150 until it engages the stop 163 from which it may be removed for subsequent operations. A stop pin 164 holds the fingers 159 in proper operative relationship when the unloading track is moved back to retracted position while the table 13 is rotating in indexing movement. The cylinders 132 and 151 are operated in proper timed relationship with the operation of the table indexing mechanism and the movement of the tailstocks by any well known electric-hydraulic control mechanism. Since the details of such control mechanism form no specific part of this invention, further detailed description of such mechanism is deemed unnecessary.

Figure 5:
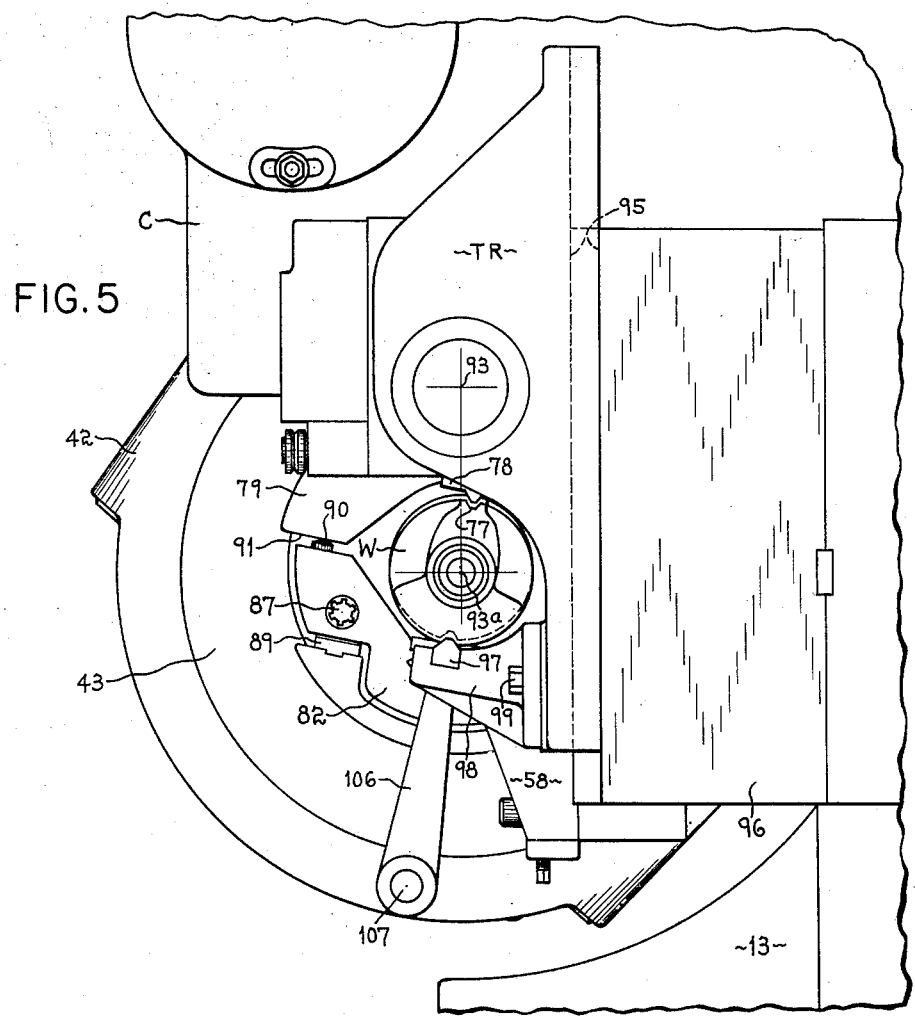
Figure 5 is an enlarged fragmentary sectional view on the line 5—5 of Figure 1 and 2, particularly showing a right hand end view of a center drive lathe unit at the chucking and unchucking station.

One preferred method of operating the machine is as follows: Assuming there have been no crankshafts presented to the machine and that the center drive lathe units A, B, C and D are in the indexed positions shown in Figures 2 and 2a, the tailstocks of the unit A will be shifted downwardly with the centers 92 on the axis 93 of the center drive ring gears, the loading track cylinder 132 is actuated to move the loading track 127 up against the surface 98a of the right hand tailstock TR of the unit A to deposit the first rough crankshaft WR on the receiving rail 97 Figure 2a and then to withdraw to the position shown in Figure 2. The table 13 then indexes in the direction indicated by the arrow I in Figure 2a to bring the unit A to a second chucking and unchucking station L. At this station L, the tailstocks shift upwardly to bring the receiving rails in a position with the work crankshaft WR positioned with its line-bearing axis 93a on the axis of rotation 93 of the center drive ring gears, Figure 5. The operator rotates the crankshaft manually about its axis 93a, if required, to bring the proper V-notches 77 in engagement with the rail 97 on the tailstock TR. With the ring gears stopped, and the chucks in the ring gears open, and with the tools in retracted position, and rails 101, 102 and 103 swung up to position 109, the operator slides the crankshaft WR axially into the chucks to the work machining position WM. The tailstocks are then lowered and the centers 92 engaged, and clamps the chucks on the crankshaft. During this time, another crankshaft has been loaded from the loading track 127 on to the unit B as described for unit A.

The table 13 again indexes to bring unit A to a third unloading station F, while unit B is indexed to the chucking and unchucking station L where another rough crankshaft is put in working position by the operator in the unit B. As the units index with the rotation of the table 13 about its axis 13a from the chucking and unchucking station L to the unloading station F, the center drive crankshaft lathe units start up the center drive ring gears and the tools feed to the work to begin the machining of all the line bearing portions of the crankshafts. As the units index from a first loading station R, the turning operations on the work have been completed, the ring gears and chucks stop rotating, and the tools move back to retracted starting position 58a. From the time the units arrive at the unloading station F, till they leave the loading or receiving station R, the center drive units are continuously operating to complete all of the line bearing portions of the crankshafts.

After all of the units have been loaded as described, the unit D moves to the chucking and unchucking station L with a crankshaft in the chucks in machining position WM which has just been completely machined, and with a rough crankshaft on the right hand tailstock TR ready to be chucked in operating position in unit D. The tailstocks are then shifted upwardly to bring the rough crankshaft WR in alignment with the chucks. The operator then pushes the rough crankshaft WR axially into machining position WM in the chucks which he have now loosened. This pushes the finished crankshaft WF out of the chucks on to the receiving rail 97 on the left hand tailstock TL, Fig. 2a. The centers 92 are again engaged after shifting the tailstocks downwardly and the chucks clamped on the rough workpiece WR. The table 13 indexes the unit D to the unloading station F where the unloading track 148 is actuated to take the finished crankshaft WF off of the receiving rail 97 of the left hand tailstock. In this manner, the machine continues to operate, receiving rough crankshafts WR at the loading or receiving station R and removing finished crankshafts WF at the unloading station F, while the operator is required only to manually slide in and push out the rough and finished crankshafts and to properly chuck the rough crankshafts WR in machining position WM in the units at the chucking and unchucking station L.

Having thus fully set forth and described this invention, what is claimed is:

1. In a work handling apparatus for a center drive crankshaft lathe having, a right hand and a left hand tailstock vertically reciprocable on said lathe horizontally disposed centers in said tailstocks, a work receiving rail on each of said tailstocks, means for vertically shifting said tailstocks to present either said centers or said receiving rails in operative position in said lathe, means for horizontally loading unmachined crankshafts on a receiving rail of one of said tailstocks comprising a reciprocatable loading track inclined downwardly toward said receiving rail, power means for reciprocating said loading track, a trip stop on the inner lower end of said loading track arranged to engage said receiving rail when in operative position when said loading track is moved toward said tailstock to engage said rail to release an unfinished crankshaft and deposit it on said receiving rail of said one tailstock, and means for removing a finished crankshaft from the receiving rail of said other tailstock comprising, a reciprocatable unloading track inclined downwardly away from said other tailstock, power means for horizontally reciprocating said unloading track, and pickup fingers on the inner raised end of said unloading track adapted to engage said receiving rail on said other tailstock when said unloading track is moved toward and in engagement with said other tailstock to remove said finished crankshaft from said receiving rail.

2. In a work handling apparatus for a machine tool having a frame, a movable tailstock, a center and a receiving rail on said tailstock, means for moving said tailstock to present either said center or said receiving rail in operative position in said machine tool, a downwardly and inwardly inclined track including a pair of spaced rails, a loading frame fixed relative to the frame of said machine tool, guideways on said loading frame for reciprocatably carrying said pair of spaced rails, power means interconnected between said spaced rails and said loading frame to reciprocate said spaced rails relative to said tailstock, a trip stop rockably mounted on the inner lower end of said rails, a downwardly depending arm on said trip stop adapted to engage the side of said receiving rail of said tailstock when said receiving rail is moved to operative position, a second upwardly extending arm on said trip stop adapted to engage a workpiece on said spaced rails at a point between said receiving rail and said workpiece, and a third horizontally disposed rearwardly extending arm on said trip stop extending under a workpiece on said spaced rails and engaged by said second arm of said trip stop.

3. In a work handling apparatus for a machine tool having a frame, a movable tailstock, a center and a receiving rail on said tailstock, means for moving said tailstock to present either said center or said receiving rail in operative position in said machine tool, an unloading frame fixed relative to said machine frame, upwardly and rearwardly sloping guideways on said unloading frame, a pair of unloading tracks reciprocatably mounted on said unloading frame, means for reciprocating said tracks, pickup fingers pivotally mounted on the upper inner ends of said rails, stop pin means on said upper inner ends of said rails to position said pickup fingers below the top work engaging surfaces of said tracks, and an abutment surface on the under side of said fingers adapted to engage said receiving rail when in operative position to cause said pickup fingers to be raised upwardly to engage a workpiece on said receiving rail and move said workpiece toward and onto said tracks.

HAROLD J. SIEKMANN.
WALTER R. MEYER.

References Cited in the file of this patent

UNITED STATES PATENTS

| Number | Name | Date |
|---|---|---|
| 623,036 | Richmond | Apr. 11, 1899 |
| 701,081 | Pierce | May 27, 1902 |
| 1,252,928 | Muller | Jan. 8, 1918 |
| 1,723,369 | Pew | Aug. 6, 1929 |
| 1,782,138 | Davis | Nov. 18, 1930 |
| 1,835,591 | Bullard | Dec. 8, 1931 |
| 1,945,662 | Smith | Feb. 6, 1934 |
| 2,069,107 | Groene | Jan. 26, 1937 |
| 2,156,153 | Groene | Apr. 25, 1939 |
| 2,211,722 | Groene | Aug. 13, 1940 |
| 2,221,049 | Groene | Nov. 12, 1940 |
| 2,249,241 | Groene | July 15, 1941 |
| 2,356,226 | Delahan | Aug. 22, 1944 |
| 2,554,664 | Davis | May 29, 1951 |